United States Patent [19]

Kato et al.

[11] Patent Number: 4,648,288
[45] Date of Patent: Mar. 10, 1987

[54] POWER TRANSMITTING DEVICE

[75] Inventors: Heizaburou Kato, Ichikawa; Masao Anma, Shizuoka, both of Japan

[73] Assignee: Sankyo Manufacturing Company, Ltd., Tokyo, Japan

[21] Appl. No.: 887,975

[22] Filed: Jul. 24, 1986

Related U.S. Application Data

[63] Continuation of Ser. No. 666,583, Oct., 1984, abandoned.

[30] Foreign Application Priority Data

Nov. 1, 1983 [JP] Japan .......................... 58-168458[U]

[51] Int. Cl.⁴ ...................... F16H 15/50; F16H 13/10
[52] U.S. Cl. ........................................ 74/798; 74/212
[58] Field of Search ........................ 74/798, 212, 196

[56] References Cited

U.S. PATENT DOCUMENTS

| | | | |
|---|---|---|---|
| 1,864,635 | 6/1932 | Bentner et al. | 74/212 X |
| 4,302,988 | 12/1981 | Takahashi et al. | 74/798 |
| 4,483,216 | 11/1984 | Takahashi et al. | 74/798 |

FOREIGN PATENT DOCUMENTS

| | | | |
|---|---|---|---|
| 239854 | 6/1910 | Fed. Rep. of Germany | 74/212 |
| 241543 | 8/1910 | Fed. Rep. of Germany | 74/212 |
| 2935088 | 1/1981 | Fed. Rep. of Germany | |
| 3306998 | 9/1983 | Fed. Rep. of Germany | |
| 0008857 | 1/1983 | Japan | 74/798 |
| 112015 | 1/1919 | United Kingdom | 74/798 |
| 210910 | 2/1924 | United Kingdom | 74/798 |
| 417279 | 10/1934 | United Kingdom | 74/798 |

Primary Examiner—Leslie Braun
Assistant Examiner—Dirk Wright
Attorney, Agent, or Firm—Pollock, Vande Sande & Priddy

[57] ABSTRACT

A planetary roller type power transmission device has a first rotary shaft and a second rotary shaft which are arranged coaxially, a sun roller connected to the first rotary shaft, a stationary outer ring disposed concentrically with the sun roller, and a plurality of planet rollers disposed in the annular space between the sun roller and the stationary outer ring, the planet rollers being carried by a carrier rotatable as a unit with the second rotary shaft. The power transmission device further has a pair of mutually opposing flange-like projections formed on the outer peripheral surface of the stationary outer ring so as to pass positions adjacent to respective axial ends of the area of contact between the planet rollers and the stationary outer ring, and a tightening means operable from the outside of the transmission device and adapted to urge the flange-like projections towards each other thereby causing elastic deformation of the stationary outer ring. The levels of contact pressure between the sun roller and the planet rollers and between the planet rollers and the stationary outer ring are controlled by adjustment of the amount of tightening by the tightening means.

3 Claims, 4 Drawing Figures

POWER TRANSMITTING DEVICE

This is a continuation of co-pending application Ser. No. 666,583 filed on Oct. 30, 1984, abandoned.

BACKGROUND OF THE INVENTION

1. Field of the Invention

The present invention relates to a planetary roller type power transmission device having a first rotary shaft and a second rotary shaft which are arranged coaxially, a sun roller connected to the first rotary shaft, a stationary outer ring disposed concentrically with the sun roller, and a plurality of planet rollers disposed in the annular space between the sun roller and the stationary outer ring, the planet rollers being carried by a carrier rotatable as a unit with the second rotary shaft, whereby a torque is transmitted between the first and the second rotary shafts through the planet rollers.

2. Description of the Prior Arts

In a planetary roller type power transmission device of the type described, it is quite important to maintain adequate levels of contact pressure between the sun roller and the planet rollers and between the planet rollers and the stationary ring, in order to attain smooth operation by eliminating slippage and play between these parts. One of the practical methods of attaining adequate levels of contact pressure is to suitably select the outside diameter of the sun roller, outside diameter of the planet rollers and the inside diameter of the stationary ring so that the desired levels of contact pressure are obtained when these parts are assembled. This method, however, requires the sun roller, planet rollers, and the stationary ring to be finished with extremely high precision. In addition, since there is no means for adjusting the contact pressure, the level of contact pressure is gradually decreased due to wear of the sun roller, planet rollers, and the stationary ring during the use of the power transmission device.

Japanese Patent Laid-Open No. 111049/1979 (Laid-Open on Aug. 31, 1979) discloses a planetary roller type power transmission device improved to overcome the above-described problems of the conventional power transmission device. This power transmission device has a stationary outer ring provided with a pair of flange-like projections which are opposite each other and extend in circumferential directions; and a casing comprised of a peripheral wall portion surrounding the stationary outer ring and an end wall portion contacting one axial end surface of the peripheral wall portion and secured to the peripheral wall portion by bolts. The peripheral wall portion has a projecting wall which projects radially inward, while the end wall portion has a projected wall which projects inwardly in the axial direction. When the peripheral wall portion of the casing and the end wall portion of the casing are assembled, the projected wall of the peripheral wall portion is made to contact the outer surface of one of the flange-like projections, while the projected wall of the end wall portion is made to contact the outer surface of the other flange-like projection so that both projected walls exert a force which urges the pair of flange-like projections towards each other, thus causing radially inward elastic deformation of the stationary outer ring to produce the desired levels of contact pressure between the sun roller and the planet rollers and planet rollers and the stationary ring. This power transmission device, however, still suffers from the disadvantage that, since the relative position between the peripheral wall portion and the end wall portion of the casing and hence the relative position between both projected walls are unchangeable, it is difficult to adjust the contact pressure by adjusting the force which is applied by the projected walls to the pair of flange-like projections. To deal with this problem, a spacer or shims are placed between the projected wall of the end wall portion and the outer surface of the cooperating flange-like projection, as a means for adjusting the above-mentioned force. In this power transmission device, when adjustment of the contact pressure becomes necessary after assembly, it is necessary to replace the spacer with another spacer of different thickness or vary the number of the shims after detaching the end wall portion from the peripheral wall portion of the casing.

SUMMARY OF THE INVENTION

Accordingly, it is an object of the invention to provide an improved planetary roller type power transmission device which permits adjustment of the levels of contact pressure between the sun roller and the planet rollers and the planet rollers and the stationary outer ring, thereby overcoming the above-described problems of the prior art.

According to a preferred embodiment of the present invention, a planetary roller type power transmission device is provided having a first rotary shaft and a second rotary shaft which are arranged coaxially, a sun roller connected to the first rotary shaft, a stationary outer ring disposed concentrically with the sun roller, and a plurality of planet rollers disposed in the annular space between the sun roller and the stationary outer ring, the planet rollers being carried by a carrier rotatable as a unit with the second rotary shaft, wherein the improvement comprises: a pair of mutually opposing flange-like projections formed on the outer peripheral surface of the stationary outer ring so as to pass positions adjacent to respective axial ends of the area of contact between the planet rollers and the stationary outer ring; and a tightening means operable from the outside of the transmission device and adapted to urge the flange-like projections toward each other thereby causing elastic deformation of the stationary outer ring; whereby the levels of contact pressure between the sun roller and the planet rollers and between the planet rollers and the stationary outer ring are adjusted by varying the degree of tightening by the tightening means.

The above and other objects, features, and advantages of the invention will become clear from the following description of the preferred embodiments when the same is read in conjunction with the accompanying drawings.

DETAILED DESCRIPTION OF THE PREFERRED EMBODIMENTS

Figure 1:
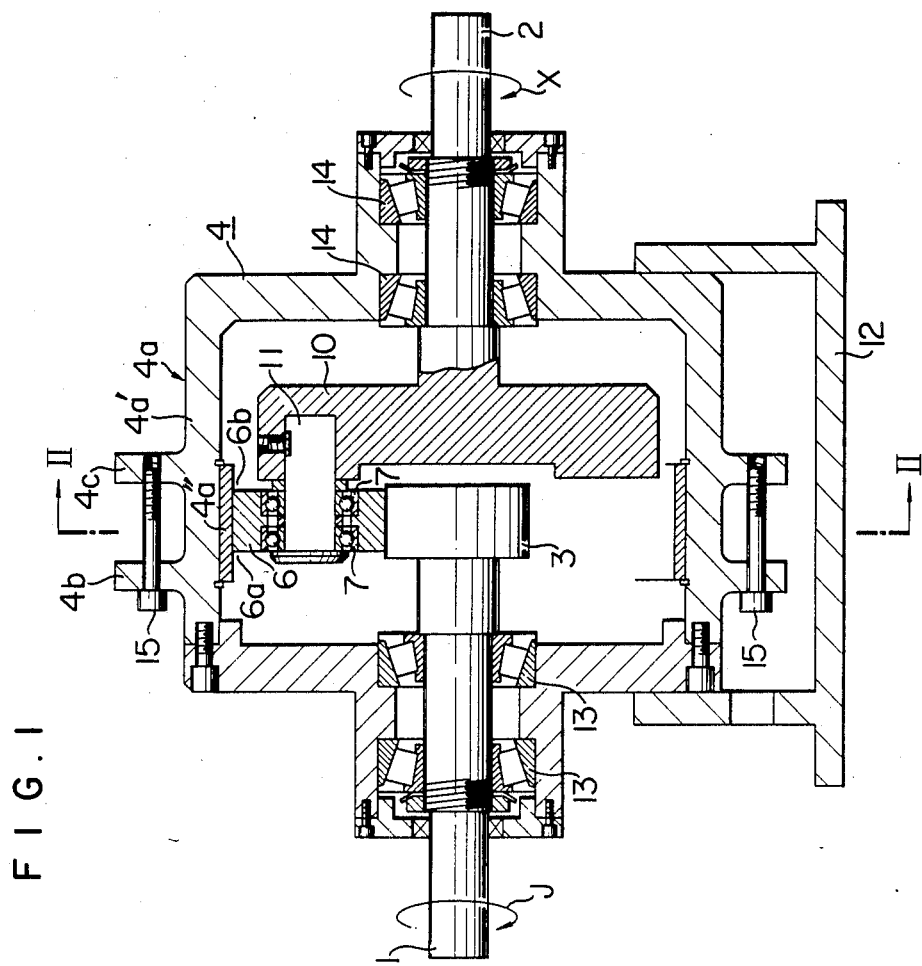
FIG. 1 is a vertical sectional view of a planetary roller type power transmission device embodying the present invention.
Figure 2:
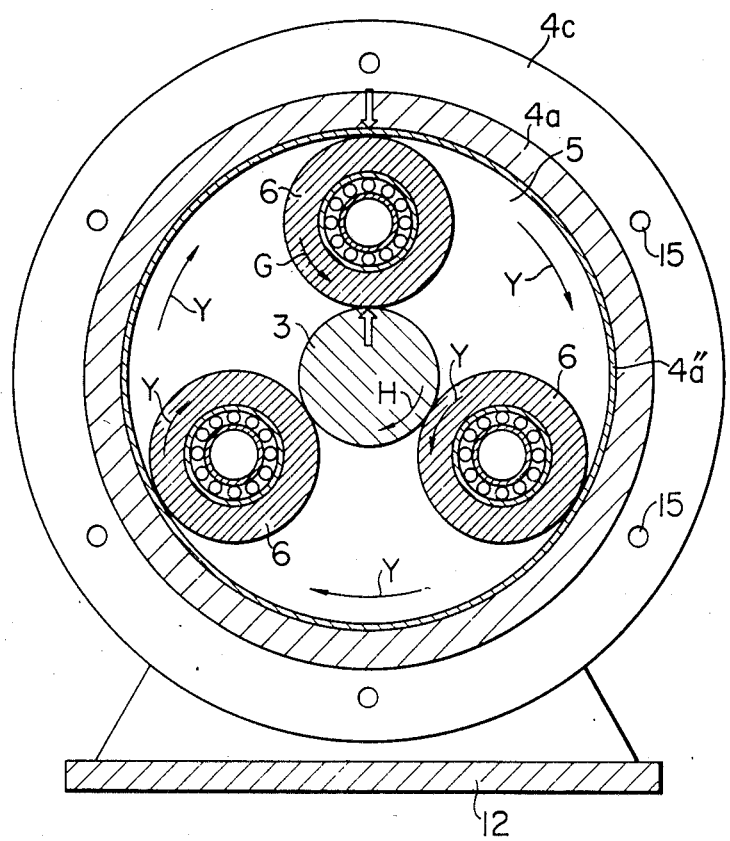
FIG. 2 is a sectional view taken along the line II—II of FIG. 1.

Referring to FIGS. 1 and 2, a planetary roller type power transmission device of the invention has a first rotary shaft 1 constructed as an output shaft, a second rotary shaft 2 constructed as an input shaft and coaxial with the first input shaft, a sun roller 3 connected to the first rotary shaft 1, a stationary outer ring 4a disposed coaxially with the sun roller and constituting a part of the casing of the power transmission device, and a plurality of planet rollers 6 disposed in the annular space 5 between the sun roller 3 and the stationary outer ring 4a. A carrier 10 is formed integrally with the left end of the second rotary shaft as viewed in FIG. 1. The carrier 10 has a plurality of pins 11 projected therefrom and rotatably supporting the planet rollers 6 through bearings 7. Thus, the planet rollers 6 are rotatably carried by the carrier 10 through the pins 11 so as to rotate and revolve when the second shaft 2 is rotated as will be explained later. Referring to FIGS. 1 and 2, reference numeral 12 designates a supporting member which supports the casing 4, numerals 13 and 14 designate bearings through which the first and second rotary shafts 1 and 2 are supported rotatably by the casing 4.

In the illustrated embodiment, the stationary outer ring 4a is constituted of a main part 4a' formed integrally with the casing 4, and a track ring 4a" fixed to the inner peripheral surface of the main part 4a'. The track ring 4a" is constituted by a hard material and has an inner peripheral surface which is finished with a high precision. The planet rollers 6, disposed in the annular space 5, make rolling contact with the inner peripheral surface of the track ring 4a" and the outer peripheral surface of the sun roller 3. It is not always necessary to construct the main part 4a' and the track ring 4a" as separate bodies. An arrangement is possible wherein the planet rollers 6 make a direct rolling contact with the inner peripheral surface of the main part 4a'. In such an arrangement, it is necessary to suitably harden the portion of the inner peripheral surface of the main part 4a' contactable with the planet rollers and to finish this portion with a high precision.

A pair of flange-like projections 4b and 4c are formed on the outer peripheral surface of the stationary outer ring 4a. One of the flange-like projections 4b is constituted by an annular projection which extends circumferentially of the stationary outer ring, to pass a position adjacent to one axial end (denoted by 6a in FIG. 1) of the area of contact between the stationary outer ring 4a and the planet rollers 6. The other flange-like projection 4c is constituted by an annular projection which extends circumferentially of the stationary outer ring, to pass a position adjacent to the other axial end (denoted by 6b in FIG. 1) of the above-mentioned area of contact between the outer ring 4a and the planet rollers 6. These flange-like projections oppose each other with a small distance left therebetween in the direction of the common axis of the first and second rotary shafts. The flange-like projection 4b is provided with a plurality of through holes arranged at a suitable pitch in the circumferential direction, while the flange-like projection 4c has corresponding threaded holes. A plurality of tightening bolts 15 are screwed into the threaded holes in the flange-like projection 4c past the holes formed in the flange-like projection 4b. As will be explained later, these bolts 15 serve as tightening members which, when screwed up, produce a force to urge the pair of flange-like projections 4a and 4b towards each other so as to cause an elastic deformation of the stationary outer ring 4a, thereby allowing adjustment of the levels of contact pressure between the sun roller 3 and the planet rollers 6 and between the planet rollers 6 and the stationary outer ring 4a.

As has been described, in this embodiment the stationary outer ring 4a serves as a part of the casing 4, so that the flange-like projections 4b, 4c on the outer periphery of the stationary outer ring 4a are not positioned in the casing but are exposed to the outside. In addition, the bolts 15 serving as the tightening members are exposed and, hence, easily accessible from the outside of the power transmission device for easy adjustment. Although the external provision of the flange-like projections 4b and 4c is not essential, it is quite important to expose the tightening bolts to allow adjustment from the outside.

In the operation of the described embodiment of the power transmission device, when the input shaft, i.e., the second rotary shaft 2, is driven in one direction indicated by an arrow X (see FIG. 1), the planet rollers 6 carried by the carrier 10 integral with the second rotary shaft 2 are made to revolve as a unit in the direction of an arrow Y (see FIG. 2) around the axis of the input shaft. That is, the planet rollers revolve around the sun roller 3 in the direction of the arrow Y. At the same time, each of the planet rollers 6 rotate about its own axis in the direction of an arrow G (see FIG. 2), thereby causing a rotation of the sun roller 3 in the direction of an arrow H (see FIG. 2). In consequence, the output shaft, i.e., the first rotary shaft 1, rotates together with the sun roller 3 in the direction of the arrow J (see FIG. 1). The following relationship exists between the number of rotations $N_1$ (r.p.m.) of the first rotary shaft and the number of rotations $N_2$ (r.p.m.) of the second rotary shaft, when the rotation of the second rotary shaft 2 is transmitted to the first rotary shaft 1 in the above-described manner.

$$N_2 \times (D/d + 1) = N_1$$

where d represents the outside diameter of the sun roller 3, while D designates the inside diameter of the stationary outer ring 4a.

As will be understood from the foregoing description, the described embodiment of the power transmission device can serve, when the second and the first rotary shafts are used as the input shaft and the output shaft, respectively, as an overspeed transmission which transmits the rotation at a speed increased by a ratio which is determined by the outside diameter of the sun roller d and the inside diameter D of the stationary outer ring. This power transmission device is usable as, for example, a device for driving a grinder. In such a case, a grinding wheel fixed to the outer end of the output shaft can be driven at a high speed to effect a highly precise grinding.

Although the embodiment has been described as an overspeed transmission which makes use of the second and first rotary shafts as the input and output shafts, respectively, it will be clear to those skilled in the art that the same transmission device can operate as a reduction gear for transmitting rotation while reducing the speed, by using the first and the second rotary shafts as the input and output shafts, respectively.

In order that this power transmission device may operate smoothly, it is necessary to eliminate any slippage and play between the parts by optimizing the levels of contact between the sun roller 3 and the planet rollers 6 and between the planet rollers 6 and the stationary outer ring 4. According to the present invention, the adjustment of the contact pressure can be easily conducted merely by tightening of bolts 15 which are exposed to the outside of the power transmission device.

Figure 3A:
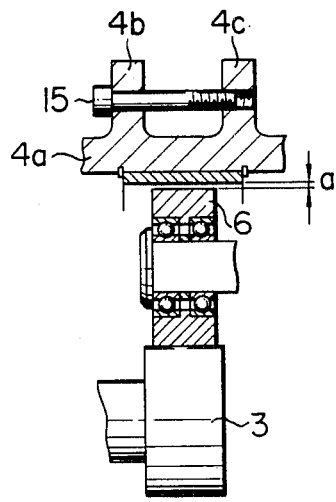
FIGS. 3A and 3B are partial sectional views illustrating the principle of adjustment of the levels of the contact pressure between the sun roller and the planet rollers and between the planet rollers and the stationary outer ring by the tightening of a tightening member.
Figure 3B:
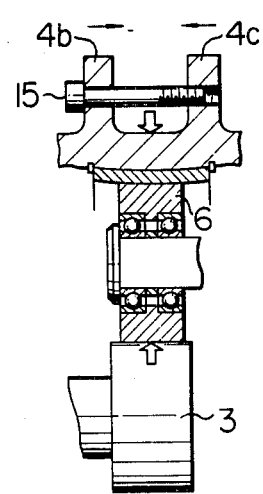

More specifically, in a state after the completion of assembly of the sun roller 3, planet rollers 6 and the stationary outer ring 4, a slight gap (a) is left between each planet roller 6 and the stationary outer ring 4 before tightening the bolts 15 as shown in FIG. 3A, so that no substantial contact pressure exists between the sun roller 3 and the planet roller 6 nor between the planet rollers 6 and the stationary outer ring 4a. Then, as the bolts 15 are tightened to urge the flange-like projections 4b and 4c towards each other, the portion of the outer stationary ring 4a between these flange-like projection 4a is plastically deflected to project downwardly as viewed in FIG. 3B. It is, therefore, possible to optimize the levels of the contact pressure between the sun roller 3 and the planet rollers 6 and between the planet rollers 6 and the stationary outer ring 4 to eliminate any slippage and play by effecting a suitable amount of deflection by adjusting the amount of tightening of the bolts 15.

As will be understood from the foregoing description, in the planetary roller type power transmission device of the invention, a pair of mutually opposing flange-like projections 4b and 4c are provided on the outer periphery of the stationary outer ring 4a to pass positions adjacent to respective axial ends of the area of contact between the stationary outer ring 4a and the planetary roller 6, and tightening members exposed to the outside of the power transmission device are operated externally so as to urge the flange-like projections towards each other thereby optimizing the levels of contact pressure between the sun roller and the planet rollers and between the planet rollers and the stationary outer ring. It is thus possible to optimize the contact pressure quite easily. The adjustment of contact pressure can be made even after the assembly of the sun roller, planet rollers and the stationary outer ring so that, when the levels of contact pressure have come down to an inadequate level, the desired contact pressure can easily be achieved again without disassembly, readjustment, and reassembly of the constituent parts.

In the illustrated embodiment, the flange-like projections 4b and 4c are comprised of annular projections extending continuously in the circumferential direction of the stationary outer ring 4. The flange-like projections, however, need not be always continuous. For instance, obviously, either one or both of the flange-like projections may be comprised of a plurality of segments which are arranged circumferentially about the stationary outer ring.

What is claimed is:

1. A power transmission device comprising a first rotary shaft and a second rotary shaft which are arranged coaxially, a sun roller connected to said first rotary shaft, a stationary outer ring disposed concentrically with said sun roller, said outer stationary ring and the casing of said power transmission device formed as one singular piece, and a plurality of planet rollers disposed in the annular space between said sun roller and said stationary outer ring, said planet rollers being carried by a carrier rotatable as a unit with said second rotary shaft, a pair of mutually opposing flange-like projections formed on the outer peripheral surface of said stationary outer ring and casing structure so as to pass positions adjacent to respective axial ends of the area of contact between said planet rollers and said stationary outer ring; and tightening means operable from the outside of said transmission casing structure and urging said flange-like projections towards each other to cause an elastic deformation of said stationary outer ring; said tightening means comprising a plurality of tightening bolts which are screwed to threaded holes in one of said flange-like projections through holes formed in the other of said flange-like projections wherein substantially only radial forces are being applied inwardly from said elastically deformed stationary outer ring upon said planet rollers whereby the levels of contact pressure between said sun roller and said planet rollers and between said planet rollers and said stationary outer ring are adjustable through adjustment of amount of tightening by said tightening means.

2. A power transmission device according to claim 1, wherein said stationary outer ring includes a main part formed integrally with said casing and a track ring fixed to the inner peripheral surface of said main part, said track ring being made of a hard material and having an inner peripheral surfaced finished with a high precision, said planet rollers making a rolling contact with the inner peripheral surface of said track ring and the outer peripheral surface of said sun roller.

3. A power transmission device according to claim 1, wherein said flange-like projections include annular projections extending continuously in the circumferential direction of said stationary outer ring, and said tightening bolts are arranged in the circumferential direction of said stationary outer ring.

* * * * *